No. 755,885. PATENTED MAR. 29, 1904.
W. H. KESSLER.
REVERSING PULLEY MECHANISM.
APPLICATION FILED NOV. 1, 1902. RENEWED SEPT. 8, 1903.
NO MODEL.
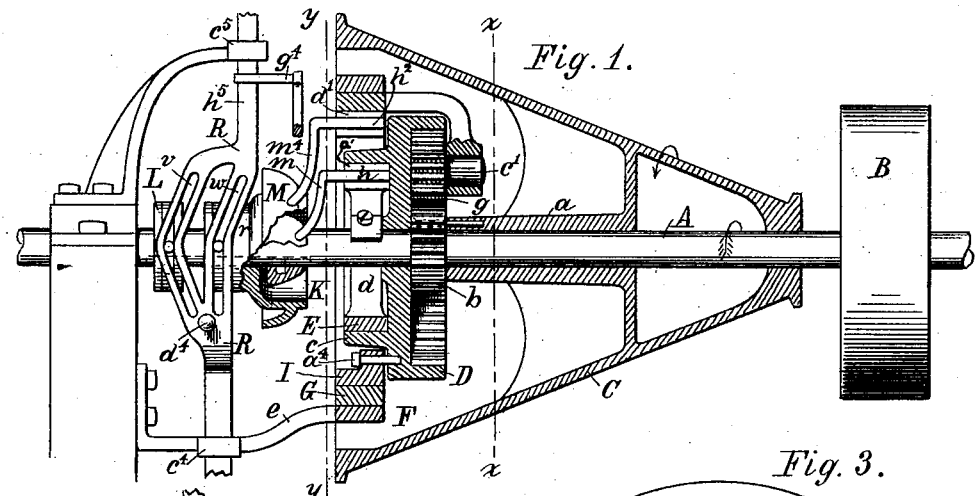
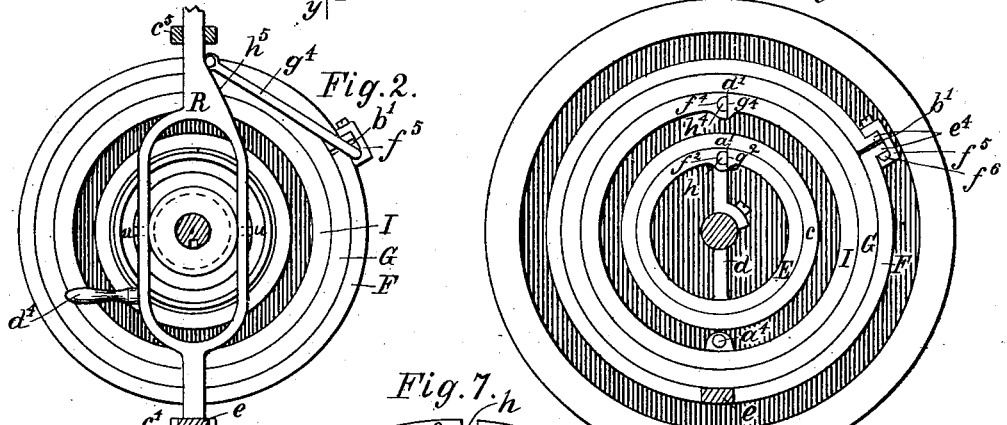
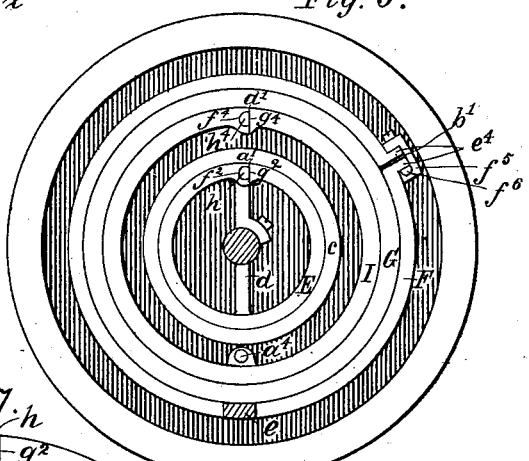
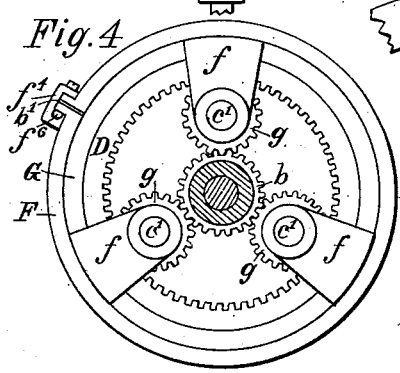
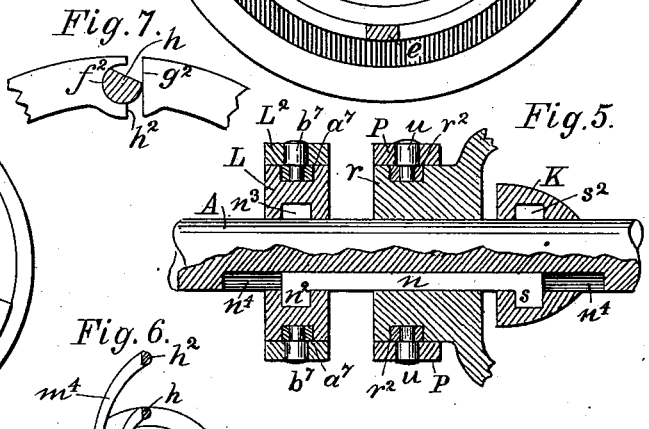
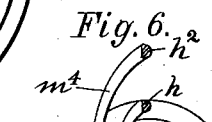
WITNESSES:
Geo. R. Hall
Herman Hare
INVENTOR
William H. Kessler
BY
James A. Whitney
ATTORNEY No. 755,885. Patented March 29, 1904.

UNITED STATES PATENT OFFICE.

WILLIAM H. KESSLER, OF PASSAIC, NEW JERSEY.

REVERSIBLE PULLEY MECHANISM.

SPECIFICATION forming part of Letters Patent No. 755,885, dated March 29, 1904.

Application filed November 1, 1902. Renewed September 8, 1903. Serial No. 172,261. (No model.)

*To all whom it may concern:*

Be it known that I, WILLIAM H. KESSLER, a citizen of the United States, and a resident of Passaic, in the county of Passaic and State of New Jersey, have invented certain new and useful Improvements in Reversible Pulley Mechanisms; and I do hereby declare that the following is a full, clear, and exact description of the same, reference being had to the accompanying drawings, making a part of this specification, in which—

Figure 1 is a central longitudinal sectional view of a reversible pulley mechanism made according to my invention. Fig. 2 is an end view thereof as viewed from the left. Fig. 3 is a transverse sectional view taken in the line $xx$ of Fig. 1 and as viewed from the right. Fig. 4 is a transverse sectional view taken in the line $yy$ of Fig. 1 and as viewed from the right. Fig. 5 is a detail longitudinal sectional view on a larger scale. Figs. 6 and 7 are transverse sectional detail views.

This invention comprises certain new and useful combinations of instrumentalities hereinafter fully set forth and described, whereby effective provision is made for reversing the motion of a pulley without reversing the motion of its shaft.

A is a revoluble shaft driven by a band-wheel B or other suitable means. Loose on this shaft is a pulley C, which may be of conical contour, as shown in the drawings, or cylindric or other suitable shape. This pulley has a hub $a$, fast on the end of which is a pinion $b$. Adjacent to this pinion $b$ is an internal gear D, loose upon the shaft A, and having upon its back and integral with or otherwise fast thereto an annular flange $c$. Fast upon the shaft and within the range of the flange $c$ is a split ring E, the split whereof is shown at $a'$ in Figs. 1, 3 and by $h^2$ of Fig. 7. This split ring E is connected with the shaft by one or more spokes $d$. The arrangement of this split ring E is such that when expanded, as herein presently explained, it will crowd against the inner surface of the flange $c$ and be thereby clutched to the said flange, and consequently to the gear D. Concentric with the flange $c$, but at a suitable distance therefrom, is a second split ring F. The split of this ring is shown at $b'$ in Figs. 2, 3, and 4. This second split ring F is fixed or non-revoluble and is supported by a suitable fixture, which, as shown in Fig. 1, may comprise a fixed bracket $e$. Placed within this split ring F is a continuous or unbroken ring G, which has any desired number of arms $f$, each of which carries the short shaft or gudgeon $c'$ of a pinion $g$. Each of these pinions gears at one part of its circumference with the internal gear D and at another with the pinion $b$ of the pulley C, as shown more fully in Fig. 4. While, as shown and described herein, the internal gear D, the pinion $b$, and the intermediate pinions $g$ are represented as toothed gears and of the spur variety, it is to be understood that the terms "gear" and "pinion" as herein employed are intended to include any kind of motion-transmitting mechanism properly within the broad meaning in the art of the said terms—as, for example, friction-gearing, &c. Within the continuous ring G is placed a third split ring I, the split $d'$ of which is shown in Figs. 1 and 3. At a point which should be practically midway between its ends—in other words, equidistant from its split—this ring I is attached to the back of the gear D, as by a pin $a^4$ in Figs. 1 and 3. The fixed split ring F, the continuous ring G, and the third split ring I being placed one within another are held concentric with the shaft A, inasmuch as the fixed split ring which is outermost is held stationary by its bracket or fixture $e$. The retention of the parts in position is also assisted to a material extent by the bearing of the pinions $g$ upon the pinion $b$ and upon the internal gear D, as hereinbefore set forth. When the fixed split ring F is contracted, it grips or clutches upon the outside of the continuous ring G. When the second split ring I is expanded, it grips or clutches upon the inside of the said continuous ring G.

The expansion of the split ring E and of the split ring I is accomplished by devices which, as provided for the expansion of the split ring E, are duplicated for the expansion of the split ring I and which are constructed for operation as more fully shown in the detail view Fig. 7. It will be seen that the split of the ring is transverse, that in one of the surfaces of the split is a semicylindric seat or socket $f^2$, while the opposite surface $g^2$ of the split is flat or substantially so. Placed in the socket $f^2$ is an axially-movable bolt $h$, which in its cross-section is more or less semicylindric, so that when the bolt is turned to one position its flat surface is flush with the surfaces $h^2$ at the sides of the socket, so that the two surfaces of the split may come together by the elasticity of the ring itself, so that the latter is contracted. When, however, the bolt is turned axially to the position shown in Fig. 7, a portion of the bolt is projected outward beyond the socketed surface of the split and acting upon the opposite surface of the split spreads the latter and expands the ring. The bolt receives its axial movement by means of an arm $m$ at one end thereof. This arm (not shown in Fig. 7) is represented in its connection with the bolt in Figs. 1 and 6. Said arm is actuated by means herein presently to be described. As above remarked, the said mechanism for expanding one of the said split rings is duplicated for expanding the other; but for convenience of designation the reference-letters for said mechanism for the ring I are $f^4$, $g^4$, $h^4$, and $m^4$, respectively, instead of $f^2$, $g^2$, $h$, and $m$, which latter indicate corresponding parts of the mechanism for the ring E. The arm $m$, which by its motion gives the turning or axial movement to the bolt $h$ of the split ring E, is actuated by a sliding cam K, which is loose on the shaft A and which receives its movement along said shaft from a sliding collar L, this latter being connected with the cam K by means of a key $n$, which works in a longitudinal groove $n^4$ in the shaft A. In the cylindric surface of this collar is a circumferential groove $a^7$, in which is a loose ring $L^2$, from which at opposite parts of its circumference project studs $b^7$, as shown more fully in Fig. 5. Upon one end of the key $n$ is a spur $n^2$, which works in an internal annular groove $n^3$ in the sliding collar L and at the other end has a similar spur $s$, which works in a similar internal groove $s^2$ in the cam K, as shown in the detail view Fig. 5, so that a sliding movement being given to the collar a like movement is given to the cam, and the latter, pushing the arm $m$ of the bolt $h$ aside, gives the requisite turning movement to the bolt to expand the ring E. Slidable upon the shaft A is a second cam M, the hub $r$ of which is circumferentially grooved, as at $r^2$, and in this groove is fitted a loose ring P, which at opposite parts of its circumference has radially-projecting studs $u$. The inward movement of this second cam M actuates the arm $m^4$ of the bolt of the split ring I in the same manner that the cam K actuates the similar arm $m$ of the bolt of the split ring E, with a corresponding result in expanding the ring I. The requisite simultaneous but differential motions of the two cams is provided for by cam-slots $v$ and $w$ in a longitudinally-movable frame R, the studs $b^7$ of the ring $L^2$ of the collar L working in the slots $v$ and those of the ring in the hub $r$ working in the slots $w$ of the said frame. This frame slides in suitable fixed bearings $c^4$ and $c^5$ and may on occasion receive its longitudinal movement from any suitable device—as, for example, a handle $d^4$. (Shown in Figs. 1 and 2.)

To provide for the contraction of outer and fixed split ring F, its ends at its split are provided with outwardly-turned lugs $e^4$, as shown in Fig. 3. To one of these is attached a clamp $f^5$, which laps over the lug at the opposite side of the split. In the last-indicated end of the clamp is a semicylindric seat in which is placed a semicylindric bolt $f^6$, to one end of which is provided an arm $g^4$, the free end of which rests against an inclined plane or cam-like surface $h^5$ on the frame R. The action of the inclined plane $h^5$ on the arm $g^4$ gives an axial movement to the bolt $f^6$, which brings its greater diameter between the side of the clamp and the outer side of the adjacent lug $e^4$, and thereby brings the opposite sides of the split toward each other to contract the ring.

The operation of the apparatus is as follows, the frame R being in a midway position with the parts actuated thereby inoperative for the time being, with the pulley loose to move in either direction upon the shaft A: Assuming the frame R to be moved in an upward direction, the inclination of the lower part of the slot $v$ slides inward the collar L, thereby, through the key $n$, moving inward the cam K against the arm $m$ of the bolt $h$ and turning the latter expands the split E in the manner hereinbefore explained to grip the inner surface of the flange $a$ of the internal gear D, thereby insuring its rotation with the shaft A. Simultaneous with this the action of the inclined plane, which in its operation is substantially a cam $h^5$ upon the free end of the lever $g^4$, turns the bolt $f^6$, thereby contracting the split ring F and, clutching the same to the continuous ring G, renders the latter non-revoluble, so that the pinions $g$ while revolving on their own axes are not carried around with the shaft. As a consequence, the rotation of the internal gear D rotates the intermediate motion-transmitting devices—the pinions $g$—and thus acting upon the gear $b$, which is fast to the hub $a$ of the pulley C, revolves the same in a direction opposite to that of the motion of the shaft, as indicated by the curved arrows in Fig. 1. It will be noticed that during the upward movement of the frame R, just herein described, the lower part of the slot $w$ of the frame is idle so far as concerns any transmission of motion to the cam M. It will also be observed that the arms by which the several semicylindric bolts are axially turned are themselves synchronously operated by the several cams which are themselves duly actuated by suitable mechanism for the purpose. To reverse the motion of the pulley from that just hereinbefore described, the movement of the frame R is reversed, with the result of first bringing the parts again to the position shown in Fig. 1, in which the pulley is free or loose upon the shaft. The continued movement of the frame by bringing the upper portions of the slots $v$ and $w$ into play upon the studs $b^7$ and $u$ of the collar L and hub $r$, respectively, slide the cams K and M inward. The inward movement of the cam K actuates the arm $m$ of the bolt $h$ of the split ring E and expanding the latter grips the same fast to the flange $c$ of the internal gear D, thereby making the latter fast to the shaft. Meanwhile the inward movement of the cam M actuates the arm $m^4$ of the bolt $h^2$ to expand the split ring I to grip upon the continuous ring G, which carries the intermediate gears $g$. As the split ring I is fast by the pin $a^4$ to the internal gear D the intermediate pinions carried by the ring G are also gripped to the shaft. The mechanism which (in the first-described operation to revolve the pulley in a direction opposite that of the shaft) being thus blocked serves merely to make the pulley for the time being fast to the shaft, so that the pulley rotates with and in the same direction as the shaft.

What I claim as my invention is—

1. The combination with a revoluble shaft, a hollow pulley loose thereon, a pinion fast to the pulley within the same, a flanged internal gear loose on the shaft, a split ring fast to the shaft and placed within the flange of the internal gear, means for expanding the said split ring to clutch the inside of the said flange to rotate the internal gear with the shaft, and a split ring fast to the internal gear and revoluble therewith, of a continuous ring outside of and concentric with said split ring, means for expanding said split ring to clutch the inside of the continuous ring, gears carried by the continuous ring and interposed between the internal gear and the pinion which is fast to the pulley and within the same, a non-revoluble split ring outside of the continuous ring and means for contracting the non-revoluble split ring to clutch the outer surface of the continuous ring, the whole coördinated for joint use and operation, as described.

2. The combination with a revoluble shaft, a hollow pulley loose thereon, a pinion fast to the pulley within the same, a flanged internal gear loose on the shaft, a split ring fast to the shaft and placed within the flange of the internal gear, and devices for expanding the said split ring to clutch the inside of the said flange, of a cam for actuating said devices, a split ring fast to the internal gear and revoluble therewith, a continuous ring outside of and concentric with said split ring, devices for expanding said split ring, a cam for actuating said devices, gears carried by the continuous ring and interposed between the internal gear and the pinion which is fast to the pulley and within the same, a non-revoluble split ring outside of the continuous ring, and means for contracting the non-revoluble split ring to clutch the outer surface of the continuous ring, all as and for the purpose herein set forth.

3. The combination with a revoluble shaft, a hollow pulley loose thereon, a pinion fast to the pulley within the same, a flanged internal gear loose on the shaft, a split ring fast to the shaft and placed within the flange of the internal gear and devices for expanding the said split ring to clutch the inside of said flange, of a cam slidable upon the shaft to operate said devices, a split ring fast to the internal gear and revoluble therewith, a continuous ring outside of and concentric with said split ring, devices for expanding said split ring, a cam slidable upon the shaft for operating said devices, mechanism for operating said cam synchronously with the cam just hereinbefore mentioned, gears carried by the continuous ring and interposed between the internal gear and the pinion which is fast to the pulley within the same, a non-revoluble split ring outside of the continuous ring and means for contracting said non-revoluble split ring upon the outside of the continuous ring, all substantially as and for the purpose specified.

4. The combination with a revoluble shaft, a hollow pulley loose thereon, a pinion fast to the pulley within the same, a flanged internal gear loose on the shaft, a split ring fast to the shaft, placed within the flange of the internal gear and having in one of the surfaces of its split, a semicylindric seat, a semicylindric bolt placed in said seat, and an arm provided to said bolt to turn the same to spread the split and expand the said split ring to clutch the inside of said flange, of a cam slidable upon the shaft to actuate the arm of the said bolt, a split ring fast to the internal gear and revoluble therewith, a continuous ring outside of and concentric with said split ring, devices for expanding said split ring, a cam slidable upon the shaft for operating said devices, mechanism for operating said devices synchronously with the axial movement of the bolt in the split of the split ring which is within the flange of the internal gear, gears carried by the continuous ring and interposed between the internal gear and the pinion which is fast to the pulley within the same, a non-revoluble split ring outside of the continuous ring, and means for contracting said non-revoluble split ring against the outside of the continuous ring, all substantially as and for the purpose set forth.

5. The combination with a revoluble shaft, a hollow pulley loose thereon, a pinion fast to the pulley within the same, a flanged internal gear loose on the shaft, a split ring fast to the shaft and placed within the flange of the internal gear, means for expanding the said split ring to clutch the inside of said flange to rotate the internal gear with the shaft, a split ring fast to the internal gear, revoluble therewith and having a semicylindric seat in one side of its split, a continuous ring outside of and concentric with said split ring, and a semicylindric bolt placed in the seat of the said split ring and having an arm whereby it may be turned to spread the split of said ring to clutch the inside of the continuous ring, of a cam slidable on the shaft for actuating said arm, gears carried by the continuous ring and interposed between the internal gear and the pinion which is fast to the pulley within the same, a non-revoluble split ring outside of the continuous ring, and means for contracting the non-revoluble split ring to clutch the outer surface of the continuous ring, all substantially as and for the purpose herein set forth.

6. The combination with a revoluble shaft, a hollow pulley loose thereon, a pinion fast to the pulley within the same, a flanged internal gear loose on the shaft, a split ring fast to the shaft placed within the flange of the internal gear, devices for expanding the said split ring to clutch the inside of said flange and a cam slidable upon the shaft to operate said devices, of a split ring fast to the internal gear and revoluble therewith, a continuous ring outside of and concentric with said split ring, devices for expanding said split ring, a cam slidable upon the shaft for operating said devices, mechanism for operating said cam synchronously with the cam just hereinbefore mentioned, gears carried by the continuous ring and interposed between the internal gear and the pinion which is fast to the pulley within the same, a non-revoluble split ring placed outside of the continuous ring and having outwardly-turned lugs at opposite sides of its split, a clamp having a semicylindric seat and placed over said lugs, a semicylindric bolt placed in said seat and having an arm by which it may be axially turned, and means for actuating said arm to thus operate the bolt to contract said non-revoluble split ring upon the outside of the continuous ring, all substantially as and for the purpose set forth.

7. The combination with a revoluble shaft, a hollow pulley loose thereon, a pinion fast to the pulley within the same, a flanged internal gear loose on the shaft, a split ring fast to the shaft placed within the flange of the internal gear, and having in one of the surfaces of its split a semicylindric seat, a semicylindric bolt placed in said seat, and an arm provided to said bolt to turn the same to spread the said split, of a split ring fast to the internal gear and having in one of the surfaces of its split a semicylindric seat, a semicylindric bolt placed in said seat, and having an arm whereby it may be turned to spread the said split, a continuous ring outside of and concentric with said split ring, gears carried by said continuous ring and interposed between the internal gear and the pinion which is fast to the pulley within the same, a non-revoluble split ring placed outside of the continuous ring and having outwardly-turned lugs, at opposite sides of the split, a clamp having a semicylindric seat and connecting said lugs, a semicylindric bolt placed in said seat and having an arm whereby it may be turned to contract upon the continuous ring to clutch the same, and synchronously-operated cams for operating the arms of the respective bolts, substantially as and for the purpose set forth.

WILLIAM H. KESSLER.

Witnesses:
JAMES A. WHITNEY,
GEO. R. HALL.